United States Patent Office 3,271,374
Patented Sept. 6, 1966

3,271,374
ACRYLIC COMPOUNDS
John R. Caldwell and Edward H. Hill, Kingsport, Tenn., assignors to Eastman Kodak Company, Rochester, N.Y., a corporation of New Jersey
No Drawing. Filed Jan. 31, 1963, Ser. No. 255,172
16 Claims. (Cl. 260—82.1)

This application is a continuation-in-part of our copending application, Serial No. 168,819, filed January 25, 1962 (now abandoned).

This invention relates to resinous linear homo and copolymers of N-substituted acrylamides and methacrylamides having the general structure:

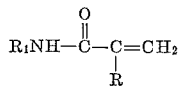

wherein R represents —H or —$CH_3$ and $R_1$ represents

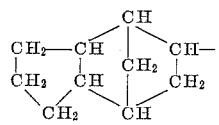

or

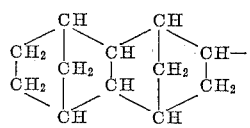

These polymers range in properties from elastic and rubbery copolymers with diolefinic comonomers, e.g., with butadiene, to hard solid homopolymers and copolymers with comonomers containing but a single —CH=C< or $CH_2$=C< group, which latter copolymers have sticking or softening points ranging from about 150 to 300° C. All of the polymers are soluble in one or more common organic solvents such as methylene chloride, 1,4-dioxane, etc., and those copolymers containing a major proportion of acrylonitrile, e.g., 60 to 95 percent by weight, are soluble in solvents such as dimethylformamide, dimethylacetamide, γ-butyrolactone, dimethylsulfolane, etc. Such solutions can be readily coated to films and sheets or spun into fibers having excellent physical properties and good affinity for commercial dyes. The copolymers containing mostly acrylonitrile are especially useful for fiber-making purposes, while the copolymers prepared with vinyl acetate, vinyl chloride, vinylidene chloride, etc., give tough, clear films. Other copolymers of the invention are particularly useful for the preparation of extruded and molded shaped articles.

It is, accordingly, an object of the invention to provide the above defined new class of acrylamides and methacrylamides. Another object is to provide resinous polymers thereof. Another object is to provide useful shaped articles from such polymers. Another object is to provide means for preparing the same. Other objects will become apparent from the description and examples.

In accordance with the invention, we prepare the new monomeric compounds by reacting the appropriate bicyclic alcohol with acrylonitrile or methacrylonitrile, at 45 to 50° C., in the presence of catalyst such as a strong mineral acid, e.g., sulfuric acid, according to the following reaction scheme:

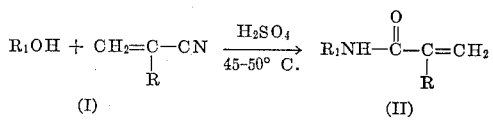

wherein R and $R_1$ are as previously defined. For further details, reference may be had to the general process for preparing acrylic amides from acrylic nitriles and alcohols as described in J. Amer. Chem. Soc., 73 page 4076 (1951), and in U.S. Patent 2,573,673. The intermediate alcohols (I) above may be prepared from the corresponding ketones by reduction of the ketones over a nickel catalyst, at 150° C., with hydrogen at 1500 p.s.i. The cyclic alcohols are obtained by the addition of vinyl acetate to cyclopentadiene according to the Diels-Alder reaction, followed by hydrogenation of the double bond and removal of the acetyl group by hydrolysis.

To prepare the polymers of the invention, the acrylamidic monomers (II) above are subjected to polymerizing conditions separately to form the corresponding homopolymers or in admixture with one or more comonomers in the proportions of from 5 to 95 parts by weight of monomer (II) and 95 to 5 parts by weight of comonomer, until from 70 percent to substantially 100 percent of the monomeric material has been converted to the desired polymer. The product can be separated by conventional means from the reaction mixture, for example, by evaporation, precipitation, etc. In general, the copolymers obtained have been found to contain approximately the same proportion of constituents as were present in the starting polymerization mixtures. The temperature can vary from 20–130° C. but preferably in the range of about 40 to 60° C. The time can vary widely, but preferably in the range of about 5 to 50 hours. Pressures, at above or below atmospheric pressures can be used. Advantageously, the polymerizations may be carried out in the dispersions of the monomeric material in an aqueous medium, although organic solvents such as lower alcohols, e.g., methanol, ethanol, etc., ketones, e.g., acetone, etc., aliphatic and aromatic hydrocarbons, e.g., heptane, benzene, etc., glycol monoethers, e.g., Cellosolve, etc., can also be employed. The term dispersion herein is intended to include both true solutions and emulsions in aqueous or non-aqueous media. Advantageously, the polymerizations are accelerated by the use of heat, actinic light such as ultraviolet and well known polymerization catalysts. Such catalysts are commonly used in the art of polymerization, and our invention is not to be limited to any particular catalyst material. Catalysts which have been found to be especially efficacious comprise the peroxides, e.g., benzoyl peroxide, acetyl peroxide, benzoyl peroxide, lauryl peroxide, oleyl peroxide, triacetone peroxide, urea peroxide, t-butyl hydroperoxide, alkyl percarbonates, etc., hydrogen peroxide, persulfates, e.g., alkali metal persulfates such as sodium and potassium persulfates, or ammonium persulfate, etc. perborates, e.g., alkali metal perborates such as sodium and potassium perborates, etc. Other catalysts such as boron trifluoride, 2,2'-azobis(2-methylpropionitrile), ketazines, azines, etc., can also be used. The quantity of catalyst can vary from about 0.1 to 5.0 percent, or even more if desired, based on the weight of monomer to be polymerized. Mixtures in any proportions of these catalysts can be used.

When the polymerizations are carried out in a water medium, an activating agent such as an alkali metal bisulfite, e.g., sodium or potassium bisulfite may advantageously be employed (in about the same amount as the catalyst), as well as a surface active agent such as a fatty alcohol sulfate, e.g., sodium or potassium cetyl sulfate, sodium or potassium lauryl sulfate, etc., aromatic sulfonates, e.g., sodium or potassium salts of alkylnaphthalenesulfonic acids, sulfonated oils, salts of fatty acids, e.g. sodium or potassium stearate, palmitate, etc., ordinary soaps, and the like. Such surface active agents are preferably used in amounts of about 3 to 5 percent based on the weight of the components to be polymerized. Chain regulators such as hexyl, octyl, dodecyl, myristyl mercaptans, etc., can also be advantageously added to the aqueous polymerization reaction mixtures.

Suitable comonomers containing a —CH=C< or CH$_2$=C< group which can be employed to form the copolymers of the invention with the acrylamidic monomers (II) above include vinyl esters of carboxylic acids, e.g., vinyl acetate, vinyl butyrate, vinyl stearate, vinyl trifluoroacetate, vinyl benzoate, corresponding isopropenyl esters, etc., vinyl alkyl ketones, e.g., methyl vinyl ketones, ethyl vinyl ketone, trifluoromethyl vinyl ketones, etc., vinyl alkyl ethers, e.g., methyl vinyl ether, butyl vinyl ether, etc., vinyl sulfonamides, e.g., vinyl sulfonamide, N-methyl vinyl sulfonamide, etc., halogen compounds, e.g., vinyl chloride, vinyl fluoride, vinylidene chloride, vinylidene fluoride, tetrafluoroethylene, chlorotrifluoroethylene, etc., styrenes, e.g., styrene, α-methylstyrene, p-methylstyrene, p-acetaminostyrene, α-acetoxystyrene, etc., acrylic and methacrylic acids, their anhydrides, amides, N-alkyl amides, N,N-dialkyl amides, and methyl, ethyl, butyl, benzyl and phenyl esters, acrylonitrile, methacrylonitrile, the esters, amides and esteramides of fumaric, itaconic and citraconic acids, N-vinyl imides, N-vinyl lactams, diolefinic monomers such as isoprene, butadiene, 2,3-dimethylbutadiene, 2-chlorobutadiene, 2-cyanobutadiene, 2-phenylbutadiene, 2-acetoxybutadiene, and the like.

Suitable comonomers containing a diolefinic or

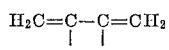

group which can be employed to form the copolymers of the invention with acrylamidic monomers (II) above in addition to butadiene include isoprene, 2,3-dimethylbutadiene, 2-chlorobutadiene, 2-cyanobutadiene, 2-phenylbutadiene, 2-acetoxybutadiene, and the like.

Other monoethylenically unsaturated organic compounds containing a —CH=C< or CH$_2$=C< group which may be used to form the copolymers of the invention with the acrylamidic monomers (II) above are disclosed in U.S. Patents 2,396,785 and 2,732,369.

The following examples will serve to illustrate further our new monomers, polymers thereof, and the manner of preparing the same.

*Example I*

(a) N - hexahydro-4,7-methanoindan-5-yl methacrylamide was prepared as follows: 134 g. (2 moles) methacrylonitrile was added to 500 g. (5 moles) 98 percent sulfuric acid cooled to 5° C. at a rate sufficient to keep the reaction temperature below 10° C. Then 304 g. (2 moles) of hexahydro-4,7-methanoindan-5-ol was added over a period of 30 minutes while maintaining the temperature at 40–50° C. The reaction was stirred at this temperature for another 30 minutes and then drowned in ice and water using a high speed stirrer to prevent the formation of large lumps. The product was filtered and slurried with water several times until the wash water was neutral. After air drying the yield of crude product was 306.5 g. or 69.7 percent of theoretical. After recrystallization from butyl acetate, the product melted at 150–150.5° C. A nitrogen analysis showed 6.28 percent N; theoretical 6.38 percent N.

(b) N - hexahydro-4,7-methanoindan-5-yl acrylamide was prepared as follows: 53 g. (1 mole) acrylonitrile dissolved in 152 g. (1 mole) of hexahydro-4,7-methanoindan-5-ol was added to 250 g. (2.5 moles) 98 percent sulfuric acid at a temperature of 40° C. over a period of 30 minutes. The reaction was allowed to stand at 40° C. for another 30 minutes and then drowned in ice and water. The product was filtered and washed with water until the filtrate was neutral. After drying at room temperature, the product weighed 179 g. or 87.3 percent of the theoretical yield. A sample which was recrystallized from butyl acetate melted at 137–139° C. A nitrogen analysis showed 6.77 percent N; theoretical 6.84 percent N.

*Example II*

(a) N - (decahydro - 1:4,5:8 - dimethanonaphth-2-yl) methacrylamide was prepared using the same method as in (a) of Example I. The product had a melting point of 161–162° C. A nitrogen analysis showed 5.64 percent N; theoretical 5.72 percent N.

(b) N - (decahydro - 1:4,5:8 - dimethanonaphth-2-yl) acrylamide was prepared using the same method as in (b) of Example I. The product had a melting point of 149–150° C. A nitrogen analysis showed 5.92 percent N; theoretical 6.07 percent N.

*Example III*

Five g. of N-hexahydro-4,7-methanoindan-5-yl methacrylamide and 0.05 g. azobisisobutyronitrile were dissolved in 40 ml. of tert-butyl alcohol and the solution was heated at 50° for 16 hours. The polymer separated from solution and was washed with isopropyl alcohol. A yield of 4.6 g. was obtained. The product was soluble in methylene chloride and ethylene dichloride. Films stuck on the hot bar at 185–190° C. The films are useful as supports for photographic silver halide emulsions.

*Example IV*

Using the procedure of Example III, the homopolymer of N-hexahydro-4,7-methanoindan-5-yl acrylamide was prepared. Films of the polymer cast from methylene chloride were clear and tough.

*Example V*

Fourteen g. of acrylonitrile and 6 g. of N-hexahydro-4,7-methanoindan-5-yl methacrylamide were placed in a bottle and the following materials added:

| | |
|---|---|
| Ammonium persulfate _____g__ | 0.2 |
| Sodium bisulfite _____g__ | 0.1 |
| Sodium octadecyl sulfate _____g__ | 0.4 |
| Tert-dodecyl mercaptan _____g__ | 0.1 |
| Water _____ml__ | 100 |

The bottle was tumbled in a water bath at 50–55° C. for 18 hours. The product was filtered, washed with water, then isopropyl alcohol and dried. It weighed 17 g. Analysis showed it contained 23 percent of the amide. Ten parts of the polymer was dissolved in 40 parts of dimethylformamide and the solution was extruded through a spinneret into a precipitating bath composed of 70 percent water—30 percent dimethylformamide. The filaments were washed with water and drafted 600 percent at 125–130° C. The resulting fibers had a strength of 2.7 g./den. with 16 percent elongation, and they stuck on the hot bar at 200° C. They had a flow point of 216° at 0.2 g./den.

*Example VI*

Using the procedure described in Example V, a copolymer was prepared having the composition 75 parts acrylonitrile—25 parts N - hexahydro - 4,7 - methanoindan-5-yl acrylamide. Fibers spun from it had a strength of 3.3 g./den. with 17 percent elongation and a hot bar sticking point of 208°. They had a flow point of 240° at 0.2 g./den.

*Example VII*

Sixteen g. of acrylonitrile and 4 g. of N-hexahydro-4,7-methanoindan-5-yl methacrylamide were dissolved in 80 ml. tert-butyl alcohol containing 0.2 g. acetyl peroxide. The solution was heated at 50° for 18 hours and the polymer was filtered off, washed with isopropyl alcohol, and dried. It weighed 15.2 g. and analysis showed it contained 16 percent of the methacrylamide. Fibers spun from the polymer had a hot bar sticking point of 274°.

Example VIII

The following materials were placed in a bottle:

| | |
|---|---|
| N-hexahydro - 4,7 - methanoindan - 5 - yl acrylamide _____ g__ | 10 |
| Methacrylonitrile _____ g__ | 20 |
| Sodium dodecyl sulfate _____ g__ | 0.5 |
| Sodium persulfate _____ g__ | 0.3 |
| Water _____ ml__ | 200 |

The mixture was tumbled at 50° for 48 hours. After washing and drying the product weighed 26 g. it was useful as a molding plastic and as photographic film base.

Example IX

The following materials were placed in an autoclave:

| | |
|---|---|
| N-hexahydro - 4,7 - methanoindan - 5 - yl methacrylamide _____ g__ | 60 |
| Vinyl chloride _____ g__ | 40 |
| Sulfonated mineral oil _____ g__ | 2.0 |
| Potassium persulfate _____ g__ | 1.0 |
| Water _____ ml__ | 800 |

The mixture was stirred at 60° for 18 hours. The product weighed 88 g. The interploymer was soluble in cyclohexanone and gave clear, tough films useful as photographic film base.

Example X

Using the method of Example V, an interpolymer was prepared from the following monomers:

| | G. |
|---|---|
| Acrylonitrile _____ | 75 |
| N-(decahydro-1:4,5:8-dimethano-naphth-2-yl) acrylamide _____ | 25 |

Analysis showed the interpolymer contained 23 percent of the amide. It had a hot-bar sticking point of 230°.

Example XI

The following materials were placed in an autoclave:

| | |
|---|---|
| N - decahydro - 1:4,5:8 - dimethanonaphth-2-yl) methacrylamide _____ g__ | 25 |
| Butadiene _____ g__ | 75 |
| Soap _____ g__ | 3.0 |
| Potassium persulfate _____ g__ | 1.0 |
| Water _____ ml__ | 400 |

The mixture was stirred at 60° for 48 hours. The product was a rubber.

Example XII

Using the method described in Example V, an interpolymer was prepared from 80 percent vinylidene chloride and 20 percent N-hexahydro-4,7-methanoindan-5-yl methacrylamide. The product was useful for the manufacture of fibers and bristles.

Example XIII

Using the method described in Example VII, an interpolymer was prepared having the composition 50 percent methyl methacrylate–50 percent N-hexahydro-4,7-methanoindan-5-yl acrylamide. The interpolymer molded well and gave clear, hard buttons which had a heat distortion temperature of 124° at 66 p.s.i.

Example XIV

This example illustrates the generally higher softening points of the polymers of this invention than those of acrylic polymers containing considerably less bulky side groups on the polymer chain.

The following polymers were prepared and had softening points as indicated. The method of U.S. Patent 2,732,369 was used in preparing the first two homopolymers and the method of Example III above for the latter two.

| Composition: | Softening point, ° C. |
|---|---|
| Homopolymer of N-(2-norcamphanylacrylamide) _____ | 140–150 |
| Homopolymer of N-(2-norcamphanylmethacrylamide) _____ | 170 |
| Homopolymer of N-(hexahydro-4,7-methanoindan-5-yl)acrylamide _____ | 165–170 |
| Homopolymer of N-(hexahydro-4,7-methanoindan-5-yl)methacrylamide _____ | 185–190 |

It is seen that the polymers of the present invention soften 15° to 20° higher than corresponding N-substituted acrylamide and methacrylamide polymers of U.S. Patent 2,732,369.

Example XV

The higher softening point of copolymers of this invention is indicated in the following table.

| Composition: | Fiber sticking temperature, ° C. |
|---|---|
| 80 percent acrylonitrile 20 percent N-(2-norcamphanylacrylamide). [Example IV of U.S. Patent 2,732,369] _____ | 190 |
| 80 percent acrylonitrile 20 percent N-(hexahydro-4,7-methanoindan-5-yl acrylamide) [prepared using method of Example V above] | 224 |

Other generally similar copolymers coming within the scope of the invention may be prepared by following the procedures of the above examples with any of the mentioned copolymerizable comonomers in the specified proportions. These products also show good fiber and film properties and give high quality molded articles. While the examples describing various polymers of the invention have included only the very essential materials, it will be understood that limited amounts of inert materials such as fillers, dyes, pigments, plasticizers, etc., can be incorporated into the various polymer compositions during or after the polymerization step.

The invention has been described in detail with particular reference to preferred embodiments thereof, but it will be understood that variations and modifications can be effected within the spirit and scope of the invention as described hereinabove and as defined in the appended claims.

We claim:

1. An acrylic monomer having the general structure

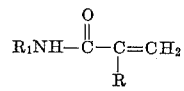

wherein R represents a member selected from the group consisting of —H and —CH$_3$ and R$_1$ represents a member selected from the group consisting of

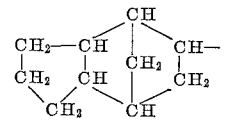

and

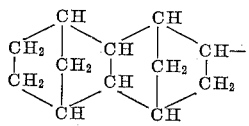

2. N-hexahydro-4,7-methanoindan - 5 - yl methacrylamide.

3. N-hexayhdro-4,7-methanoindan-5-yl acrylamide.

4. N - (decahydro - 1:4, 5:8 - dimethanonaphth-2-yl) acrylamide.

5. N - (decahydro - 1:4, 5:8 - dimethanonaphth-2-yl) methacrylamide.

6. A resinous polymer of an acrylic amide having the general structure

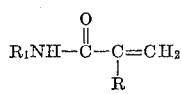

wherein R represents a member selected from the group consisting of —H and —CH₃ and R₁ represents a member selected from the group consisting of

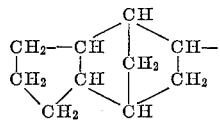

and

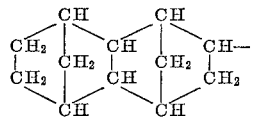

7. Poly - N - hexahydro - 4,7 - methanoindan - 5 - yl acrylamide.

8. A resinous copolymer comprising from 5 to 95 percent by weight of N-hexahydro-4,7-methanoindan-5-yl methacrylamide and from 95 to 5 percent by weight of acrylonitrile.

9. A resinous copolymer comprising from 5 to 95 percent by weight of N-hexahydro-4,7-methanoindan-5-yl acrylamide and from 95 to 5 percent by weight of methacrylonitrile.

10. A resinous copolymer comprising from 5 to 95 percent by weight of N - hexahydro- 4,7-methanoindan-5-yl acrylamide and from 95 to 5 percent by weight of vinyl chloride.

11. A resinous copolymer comprising from 5 to 95 percent by weight of N - (decahydro - 1:4, 5:8 - dimethanonaphth-2-yl) acrylamide and from 95 to 5 percent by weight of acrylonitrile.

12. A resinous copolymer comprising from 5 to 95 percent by weight of N-(decahydro-1:4,5:8-dimethanonaphth-2-yl) methacrylamide and from 95 to 5 percent by weight of butadiene.

13. A resinous copolymer comprising from 5 to 95 percent by weight of N - hexahydro - 4,7 - methanoindan-5-yl methacrylamide and from 95 to 5 percent by weight of vinylidene chloride.

14. A resinous copolymer comprising from 5 to 95 percent by weight of N - hexahydro - 4,7 - methanoindan-5-yl acrylamide and from 95 to 5 percent by weight of methyl methacrylate.

15. A copolymer comprising from 5 to 95 percent by weight of an acrylic monomer having the general structure

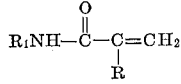

wherein R represents a member selected from the group cosisting of —H and —CH₃ and R₁ represents a member selected from the group consisting of

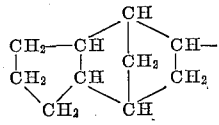

and

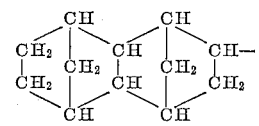

and from 95 to 5 percent of an unsaturated polymerizable compound selected from the group consisting of a monoethylenically unsaturated monomer containing a hydrocarbon group selected from the group consisting of —CH=C< and CH₂=C< and a diolefinic monomer containing an

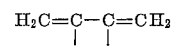

group.

16. A process for the preparation of acrylic polymers which comprises dispersing in a solvent therefor selected from the group consisting of water, lower alcohols, ketones and esters, aromatic and aliphatic hydrocarbons, dioxane and glycol-monoethers at least one compound selected from the group consisting of an acrylic monomer having the general structure

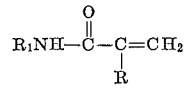

wherein R represents a member selected from the group consisting of —H and —CH₃ and R₁ represents a member selected from the group consisting of

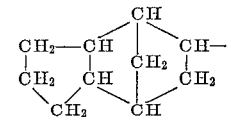

and

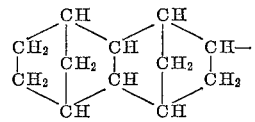

and an unsaturated polymerizable compound selected from the group consisting of a monoethylenically unsaturated monomer containing a hydrocarbon group selected from the group consisting of —CH=C< and CH₂=C< and a diolefinic monomer containing an

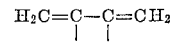

group, heating at a temperature of from 20–130° C. for a period of 5 to 50 hours, and collecting the acrylic polymer formed.

References Cited by the Examiner
UNITED STATES PATENTS 2,573,673  10/1951  Ritter _____ 260—561
2,732,369   1/1956  Caldwell et al. _____ 260—89.7

OTHER REFERENCES

Wilder et al., Jour. Am. Chem. Soc., 81, Feb. 5, 1959, pages 655–658.

Plaut et al., Jour. Am. Chem. Soc., 73, September 1951, pages 4076–7.

Soloway, Jour. Am. Chem. Soc., 74, Feb. 20, 1952, pages 1027–1029.

JOSEPH L. SCHOFER, *Primary Examiner.*

JAMES A. SEIDLECK, *Examiner.*

E. J. SMITH, *Assistant Examiner.*